United States Patent [19]

Grube et al.

[11] Patent Number: 5,483,244
[45] Date of Patent: Jan. 9, 1996

[54] METHOD AND APPARATUS OF DETERMINING LOCATION OF AN UNAUTHORIZED COMMUNICATION UNIT

[75] Inventors: Gary W. Grube, Palatine; Timothy W. Markison, Hoffman Estates, both of Ill.

[73] Assignee: Motorola, Inc., Schaumburg, Ill.

[21] Appl. No.: 222,984

[22] Filed: Apr. 5, 1994

[51] Int. Cl.⁶ .................................................. G01S 3/02
[52] U.S. Cl. ........................................ 342/463; 342/457
[58] Field of Search ................................ 342/387, 450, 342/463, 465

[56] References Cited

U.S. PATENT DOCUMENTS

| | | | |
|---|---|---|---|
| 4,494,119 | 1/1985 | Wimbush | 342/457 |
| 5,003,317 | 3/1991 | Gray et al. | 342/457 |
| 5,144,315 | 9/1992 | Schwab et al. | 342/463 |

Primary Examiner—Theodore M. Blum
Attorney, Agent, or Firm—Timothy W. Markison; Daniel C. Crilly

[57] ABSTRACT

Location of an unauthorized communication unit 102 may be detected in a wireless communication system 100 by determining that an identification code being used by the communication unit has been validated in an unauthorized manner. Having determined this, the site from which the communication unit is transmitting is determined. With the transmitting site determined, RF receivers 110, 111 in the proximity of the transmitting site are enabled to receive a subsequent RF transmission from the communication unit. The RF transmissions received by the RF receivers are then used to calculate the location of the communication unit.

8 Claims, 2 Drawing Sheets

METHOD AND APPARATUS OF DETERMINING LOCATION OF AN UNAUTHORIZED COMMUNICATION UNIT

FIELD OF THE INVENTION

The present invention relates generally to wireless communication systems and, in particular, to detecting unauthorized access to a wireless communication system.

BACKGROUND OF THE INVENTION

Wireless communication systems are known to include a communication resource controller, a plurality of communication units, and communication resources. In such communication systems, the communication units communicate with each other via a communication resource, where a communication resource may be an RF channel, a pair of RF channels, a TDM slot, or any medium for carrying RF signals. To initiate a communication, a communication unit transmits a communication request to the communication resource controller via a communication resource dedicated for control information (control channel). The communication request includes the identity of the requesting communication unit, the identity of a target communication unit, or units, and a request for a particular service, such as allocation of a communication resource. For example, the request may be for a group call which identifies all the communication units in the same group as the requesting communication unit.

Upon receiving this request, the communication resource controller determines whether the initiating communication unit has a valid unique identification code (unique ID) and is therefore allowed to access the system. If the communication unit's unique ID is valid, the communication resource controller grants the request. Having granted the request, the communication resource controller allocates a communication resource to the requesting communication unit and the target communication units, and then transmits a communication resource allocation message on the control channel.

While the communication resource controller performs a validity check of the communication unit's identity, i.e., the unit's unique ID, the controller does not verify that the communication unit received its unique identification code in an authorized manner. Typically, the unique ID is permanently programmed into the communication unit by the manufacturer prior to delivery of the communication unit. Upon delivery of the communication system, a system manager enters the unique ID of all the communication units purchased for the system into the controller, thus rendering these unique IDs valid. Because the manufacturer permanently programs the unique ID into the communication unit and the system manager programs the controller, it assumed that a valid unique ID used by a communication unit was authorized by the system manager. Unfortunately, this is not always the case. To illustrate, assume that a communication system "hacker" has knowledge of valid unique IDs for a particular system. The hacker can program these unique IDs into other communication units, such that these communication units have valid unique IDs and thus have access to the communication system, however, the unique IDs were obtained in an unauthorized manner. When these "unauthorized" communication units request access to the system, the controller verfies the unique ID and allows access.

As is readily apparent, when unauthorized communication units access a communication system, the authorized communication units suffer. They suffer because communication resources are less readily available and because the unauthorized communication units can interfere with important "authorized" communications. For example, assume that the authorized communication units are operated by a city's police force, thus most communications are important to public safety. Further assume that an "unauthorized" communication unit has received a valid unique ID from a hacker, or has stolen an authorized communication unit, and is interfering with the police communications. The person operating the unauthorized communication unit could send police officers on "wild goose" chases, or say he/she will respond to an emergency call, but doesn't. If this were to happen, disastrous results could occur.

To combat this, several techniques have been developed to detected the use of unauthorized communication units. One such technique determines the geographic separation between successive transmissions using the same unique ID within a given time period. If the geographic separation is excessive for the given time, it is assumed that more than one communication unit is using the same unique ID. Another technique counts the number of times a unique ID is used during a given time period. If the number of request is excessive, it is assumed that more than one communication unit is using the same unique ID. When multiple use is detected, a system manager is notified. The system manager may disable the communication units, thus preventing unauthorized use.

While these techniques work well to detect unauthorized use, they provide little information as to the location of the person operating the unauthorized communication unit. Ascertaining the location of such a person would be most helpful in retrieving a stolen communication unit, in apprehending the person, and preventing further interference with authorized communications. Therefore, a need exists for a method that detects the location of an unauthorized communication unit.

DETAILED DESCRIPTION OF A PREFERRED EMBODIMENT

Generally, the present invention provides a method for detecting the location of an unauthorized communication unit in a wireless communication system. This may be accomplished by determining that an identification code being used by a communication unit has been validated in an unauthorized manner. Having determined this, the site from which the communication unit is transmitting is determined. With the transmitting site determined, RF receivers in the proximity of the transmitting site are enabled to receive a subsequent RF transmission from the communication unit. The RF transmissions received by the RF receivers are then used to calculate the location of the communication unit. With such a method, the location of an unauthorized communication unit may be determined such that the person operating the unit may be apprehended, or the communication unit retrieved.

Figure 1:
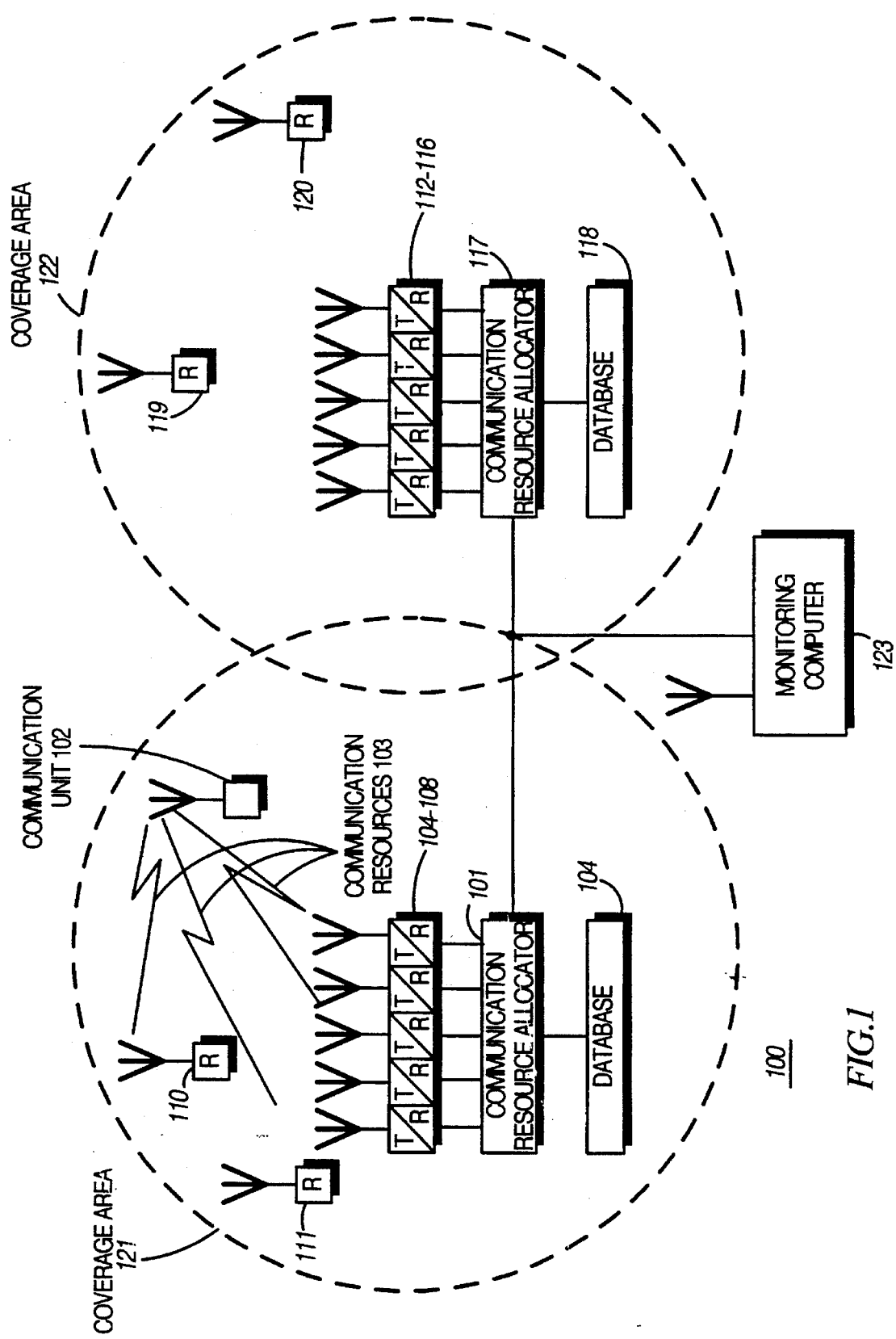
FIG. 1 illustrates a wireless communication system that supports the present invention.

The present invention can be more fully described with reference to FIGS. 1–3. FIG. 1 illustrates a wireless communication system 100 that includes two sites, which are defined by their coverage areas 121, 122. To one skilled in the art, it is readily apparent that the wireless communication system 100 may include more or less sites. Each site includes a communication resource controller, or central controller, 101, 117, communication resources 103, repeaters 104–108, 112–116, a database 104, 118, communication units 102, RF receivers 110, 111, 119, 120 and a monitoring computer 123. While only a few RF receivers are shown, one skilled in the art will appreciate that many more RF receivers could be used and that the more RF receivers used, the more accurately the location can be determined.

In operation, a communication unit 102 may request access to the communication system 100 by transmitting an inbound signaling word (ISW) to the central controller 101, 117, via a communication resource dedicated for control information (i.e., a control channel). The ISW includes the communication unit's unique ID, an ID of a target unit (i.e., the unit designated to receive a transmission from the requesting communication unit), and a service request. The service request may be for any service that the system supports. For example, the request may be for telephone interconnect, private call, group call, data communication, etc. Upon receiving the ISW, the central controller 101, 117 determines whether the unique ID is a valid ID, i.e., an ID that was entered into the controller by a system manager. If the ID is valid, the controller 101, 117 grants the request and informs the requesting unit of the grant.

In addition to the controller 101, 117 receiving the ISW, the monitoring computer 123, which may be a computing device capable of executing a series of instructions and containing sufficient memory, also receives the ISW. The monitoring computer 123 may receive the ISW via a direct link to the controller 101, 117, or by monitoring RF transmissions on the control channels. Regardless of how the monitoring computer 123 receives the ISW, it determines whether the unique ID is an authorized ID or an unauthorized ID. Recall that a unique ID may be valid, i.e., one that the controller 101, 117 recognizes, but it may be unauthorized, i.e., programmed into a communication unit by a hacker or the communication unit has been stolen and identified as missing. How the monitoring computer 123 determines whether the unique ID is authorized or unauthorized is not within the scope of this invention, but suffice to say, it uses an appropriate technique.

If the unique ID is determined to be authorized for this transmission, the monitoring computer 123 updates an internal database. If, however, the unique ID is determined to be unauthorized, the monitoring computer 123 commences with the logic diagram of FIG. 2. Note that the monitoring computer 123 may be incorporated into the central controller 101, 117 and perform the same functions as a separated computer. For the following discussion, the monitoring computer will be the device executing the steps, however, as would be appreciated by one skilled in the art, the central controller could also execute the steps, or the monitoring computer and the central controller could cooperatively execute the steps.

Figure 2:
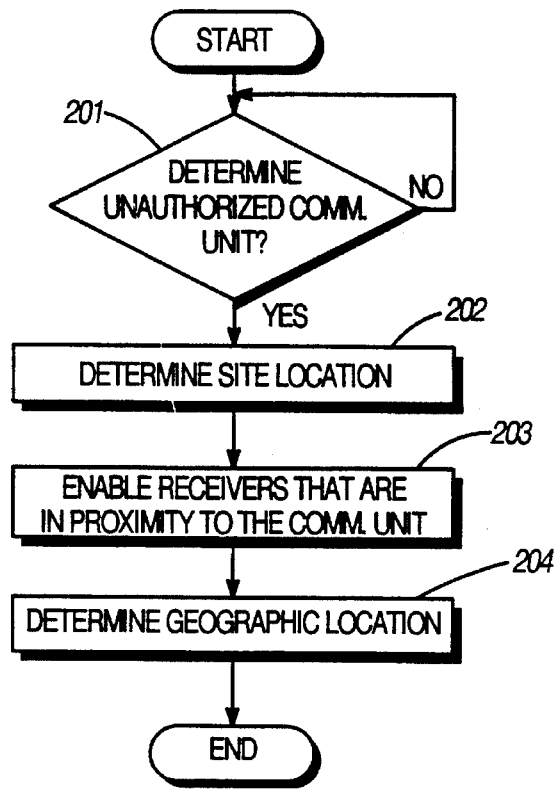
FIG. 2 illustrates a logic diagram that may be used to implement an embodiment of the present invention.

FIG. 2 illustrates a logic diagram that may be used by the monitoring computer to implement an embodiment of the present invention. At step 201, the monitoring computer determines whether an identification code (unique ID) of a communication unit is unauthorized. As mentioned above, the unique ID may be unauthorized because it was programmed into the communication unit by a hacker, or because the communication unit was identified as a stolen unit. When the unique ID is authorized, no further steps are executed for this particular transmission.

If, however, the unique ID is unauthorized 201 rendering the communication unit an unauthorized communication unit, the monitoring computer determines the site location of the unauthorized communication unit 202. The site location may be the site which received the RF transmission of the ISW or the site that received the RF transmission of the ISW with the greatest signal strength. Both techniques are readily executed by the wireless communication system. Knowing the site location, RF receivers in the proximity of the site location are enabled 203. As mentioned above, the number of RF receivers that may be enabled vary with the system architecture and the accuracy desired. For example, in a metropolitan area, accuracy is more critical than in a rural area for obvious reasons. Thus, in the metropolitan area, more RF receivers should be installed and enabled.

While the RF receivers are being enabled, the central controller is processing the service request as if the communication unit were an "authorized" unit. Upon granting the request, the central controller transmits an Outbound Signaling Word (OSW) to the unauthorized communication unit, to the monitoring computer, and to the enabled RF receivers. The OSW contains the working channel assignment, the unique ID of the unauthorized communication unit, and the service granted. The RF receivers use the OSW to adjust their input bandwidth to receive information transmitted on the assigned working channel. The RF receivers also use the OSW to determine the type of modulation and adjust a demodulator accordingly. Note that an RF receiver may be any type of communication device that is capable of receiving RF transmissions in the frequency range used by the communication system and should also include a time stamping circuit, such as a GPS receiver. The RF receivers can be directly coupled to the monitoring computer, or central controller, or they may include a transmitter. The RF receivers may also be part of a repeater that is within the proximity of the site location.

Having adjusted the input bandwidth of the enabled RF receivers, the RF receivers receive a subsequent transmission on the working channel by the unauthorized communication unit. The received signal is time stamped by each enabled RF receiver and transported to the monitoring computer. The monitoring computer then determines the location of the unauthorized communication unit based on the received signals of the enabled RF receivers 204. The monitoring computer may determine the location by a timing relationship of the received signals, i.e., based on the known locations of the enabled RF receivers and the time differential in receiving the transmission from the unauthorized unit, the location can be determined. Alternatively, the monitoring computer may use a triangulation computation. Knowing the location of the unauthorized communication unit, the proper authorities can be notified, such that the operator of the unauthorized communication unit may be apprehended or the communication unit retrieved.

As an alternative to assigning a working channel, the central controller may send an inquiry on the control channel to the unauthorized communication unit. The inquiry requires a response from the unit and the RF receivers are tuned to the frequency of the control channel to receive the response. Once the response is received, the process would continue as described above.

Figure 3:
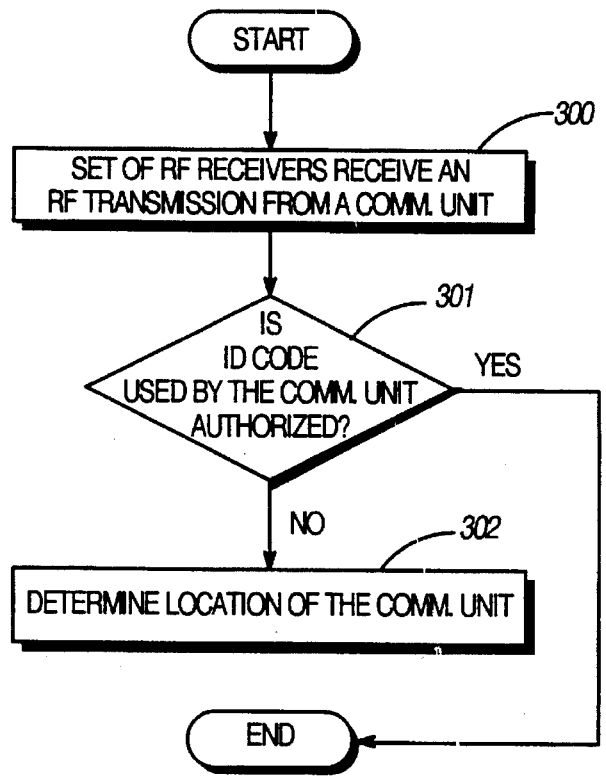
FIG. 3 illustrates a logic diagram that may be used to implement an alternate embodiment of the present invention.

FIG. 3 illustrates a logic diagram that may be used to implement an alternate embodiment of the present invention. At step 300, a set of RF receivers receive an RF transmission from a communication unit. This can be done by having the RF receivers monitor the control channel for ISWs or monitor working channels for call activity. Regardless of how the RF receivers receive the RF transmission, they time stamp it. While the RF receivers are receiving the RF transmission, the monitoring computer is determining whether the communication unit is an authorized unit 301. If the unit is authorized, i.e., using an authorized unique ID, the process ends for this transmission.

If, however, the unit is unauthorized, the monitoring computer uses the received signals of the RF receivers to determine the location of the unauthorized communication unit 302. The monitoring computer, as with the location determination step of FIG. 2, can determine the location by either a time relationship or a triangulation computation. Knowing the location of the unauthorized communication unit, the proper authorities can be notified, such that the operator of the unauthorized communication unit may be apprehended or the communication unit retrieved.

The present invention provides a method for determining the location of an unauthorized communication unit. With such a method and apparatus, an operator of an unauthorized communication unit can be apprehended, thus preventing the operator from further interfering with authorized communications. The method and apparatus also allows stolen communication units to be retrieved.

We claim:

1. In a wireless communication system, a method for determining location of an unauthorized communication unit, the method comprises the steps of:

a) receiving, by a first RF receiver of a plurality of RF receivers, an inbound signaling word from a communication unit, the inbound signaling word including an identification of the communication unit and a service request;

b) determining whether the identification code of the communication unit is unauthorized;

when the identification code of the communication unit is unauthorized:

c) determining a site location of the communication unit;

d) transmitting a communication resource assignment to the communication unit and at least a second RF receiver of the plurality of RF receivers in response to the service request, the at least a second RF receiver being proximate to the site location of the communication unit;

e) receiving, by the at least a second RF receiver, a subsequent RF transmission from the communication unit via a communication resource identified in the communication resource assignment; and f) determining a geographic location of the communication unit based on the subsequent RF transmission.

2. In the method of claim 1, step (c) comprises the step of determining a site location of the first RF receiver to produce the site location of the communication unit.

3. In the method of claim 1, step (c) comprises the step of determining a site location of an RF receiver of the plurality of RF receivers that received the service request with greatest signal strength to produce the site location of the communication unit.

4. In the method of claim 1, step (e) further comprises the step of, prior to receiving the subsequent RF transmission, tuning the at least a second RF receiver to a frequency identified in the communication resource assignment.

5. In the method of claim 1, step (e) further comprises the step of, prior to receiving the subsequent RF transmission adapting the at least a second RF receiver to a demodulation type that substantially matches a modulation type identified in the communication resource assignment.

6. In the method of claim 1, wherein step (e) comprises the step of receiving, by three RF receivers, the subsequent RF transmission from the communication unit, step (f) comprises the step of determining the geographic location of the communication unit based on a triangulation computation of a direction for the subsequent RF transmission received at the three RF receivers.

7. In the method of claim 1, step (f) comprises the step of determining the geographic location of the communication unit based on a timing relationship of an arrival time of the subsequent RF transmission at the first RF receiver and the at least a second RF receiver.

8. A wireless communication system comprising:

a first RF receiver that receives an inbound signaling word from a communication unit, the inbound signaling word including an identification of the communication unit and a service request;

a communication resource controller, coupled to the first RF receiver, that tranmits a communication resource assignment to the communication unit in response to the service request;

at least a second RF receiver that receives the communication resource assignment, tunes to a communication resource identified in the communication resource assignment, and receives a subsequent RF transmission from the communication unit via the communication resource; and a monitoring computer, coupled to the first RF receiver and the at least a second RF receiver, that is programmed to detect whether the communication unit is unauthorized, and, when the communication unit is unauthorized, is programmed to determine a geographic location of the communication unit based on the subsequent RF transmission received by the at least a second RF receiver.

* * * * *